(12) United States Patent
Wagenaar Cacciola

(10) Patent No.: US 9,232,612 B2
(45) Date of Patent: Jan. 5, 2016

(54) APPARATUS AND METHOD FOR LUMINANCE CONTROL

(75) Inventor: Giovanna Wagenaar Cacciola, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 184 days.

(21) Appl. No.: 14/001,076

(22) PCT Filed: Feb. 3, 2012

(86) PCT No.: PCT/IB2012/050507
§ 371 (c)(1),
(2), (4) Date: Aug. 22, 2013

(87) PCT Pub. No.: WO2012/120386
PCT Pub. Date: Sep. 13, 2012

(65) Prior Publication Data
US 2013/0334973 A1    Dec. 19, 2013

(30) Foreign Application Priority Data
Mar. 4, 2011   (EP) ...................................... 11157062

(51) Int. Cl.
*H05B 37/02*   (2006.01)
(52) U.S. Cl.
CPC .................................. *H05B 37/0227* (2013.01)
(58) Field of Classification Search
CPC ........... H05B 37/0218; H05B 33/0869; H05B 39/042; H05B 41/3922; F21V 23/0442; G05B 11/017; Y02B 20/14

USPC ......... 315/152, 307, 149, 150, 291, 294, 312, 315/158, 156
See application file for complete search history.

(56) References Cited

U.S. PATENT DOCUMENTS

| 5,254,909 A | 10/1993 | Shyu et al. |
| 5,422,544 A * | 6/1995 | Giddings et al. ............... 315/156 |
| 2007/0285569 A1* | 12/2007 | Nakamura et al. ............ 348/564 |
| 2009/0262189 A1 | 10/2009 | Marman |
| 2010/0201267 A1* | 8/2010 | Bourquin et al. ............... 315/32 |

FOREIGN PATENT DOCUMENTS

| CN | 200980186 Y | 11/2007 |
| CN | 101969718 A | 2/2011 |
| EP | 1566311 A2 | 8/2005 |
| EP | 2271184 A1 | 1/2011 |
| JP | 2004259585 A | 9/2004 |
| JP | 2010009891 A | 1/2010 |
| WO | 0199474 A1 | 12/2001 |
| WO | 03098977 A1 | 11/2003 |
| WO | 2007026170 A2 | 3/2007 |
| WO | 2009003279 A1 | 1/2009 |

* cited by examiner

Primary Examiner — Lincoln Donovan
Assistant Examiner — Thomas Skibinski
(74) Attorney, Agent, or Firm — Meenakshy Chakravorty

(57) ABSTRACT

A control unit for controlling luminance in a space, the control unit being configured to estimate a trajectory of a target relative to the space, and control the luminance in the space based on the estimated trajectory and on a function rate corresponding to an adaptability of the target eye to changes in luminance.

15 Claims, 2 Drawing Sheets

APPARATUS AND METHOD FOR LUMINANCE CONTROL

FIELD OF THE INVENTION

The present invention relates to an apparatus and a method for luminance control. In particular, the present invention relates to a control unit for controlling luminance in a space and a method thereof.

BACKGROUND OF THE INVENTION

Artificial lighting is used for many applications, such as e.g. the lighting of a room or rooms in a home, or for the illumination of other spaces such as e.g. offices, restaurants, museums, and shops. The control of artificial lighting may be manual, wherein a lighting system may be provided with a manual switch. The lights may be turned on by a person present in a space by means of the manual switch, thereby illuminating the space. Instead of a manual operation, there may be provided an automatic presence detection arrangement which is connected to the lighting system. Upon detection by the sensor of the presence of a person in a space, the lights may be turned on. Analogously, when the person leaves the space, he may manually turn off the lights. Alternatively, an automatic presence detection arrangement may detect that no person is present in the space, and turn off the lights automatically.

Both for manually and automatically controlled lighting systems, lights are often completely turned on or off. In other words, a light source is often switched on to (or off from) a specific power of the light source. However, for certain applications, a fast change in lighting intensity with a sharp change from "on" to "off" or vice versa may be discomforting for the eyes. Moreover, passing from a space with bright light to a space which is dark (or vice versa), may limit the ability of a person, at least for a time, to see properly, as the pupils of the eyes need time to adapt to the new setting of the light. For this purpose, it is of interest to provide a convenient adaptation of the lighting.

Prior art apparatuses and methods, however, do not provide a satisfactory adaptation of the lighting. Thus, there is a need for providing new devices and methods providing a more convenient and/or effective lighting control.

SUMMARY OF THE INVENTION

It is an object of the present invention to mitigate the above problems and to provide a control unit that provides an improved lighting control.

This and other objects are achieved by providing a control unit and a method having the features defined in the independent claims. Preferred embodiments are defined in the dependent claims.

Hence, according to a first aspect of the present invention, there is provided a control unit for controlling luminance in a space. The control unit is configured to estimate a trajectory of a target relative to the space. Furthermore, the control unit is configured to control luminance in the space based on the estimated trajectory and on a function rate corresponding to an adaptability of the target eye to changes in luminance.

According to a second aspect of the present invention, there is provided a method for controlling luminance in a space. The method comprises the step of estimating a trajectory of a target relative to a space. Furthermore, the method comprises the step of controlling luminance in the space based on the estimated trajectory and on a function rate corresponding to an adaptability of the target eye to changes in luminance.

Thus, the present invention is based on the idea of controlling luminance in a space based on the combination of two parameters, namely the estimated trajectory of a target relative to the space and a function rate corresponding to an adaptability of the target eye to changes in luminance. The present invention is advantageous in that it provides an efficient and convenient control of luminance (i.e. the lighting) in the space. As compared to prior art techniques based on e.g. presence detection of a person in a room, and wherein the lighting is adjusted after the person is already present in a room (thereby resulting in a lighting which is less effective, e.g. due to a long time of response in the lighting adaptation), the control unit and the method of the present invention are advantageous in that since the position of the target in the space is obtained in advance via the estimated trajectory, the control of luminance in the space is faster. The control of luminance is further improved by controlling/adapting the luminance based on the adaptability of the target eye to changes in luminance.

It will be appreciated that the inventors have realized that a control unit and a method for controlling luminance in a space based on estimating a trajectory of the target relative to the space and on a function rate corresponding to an adaptability of the target eye to changes in luminance provides a faster control (and thereby a more suitable control) of the luminance in the space. The present invention is advantageous in that it improves the ability of a target, e.g. a person, to adapt to a luminance which may be different from a previous luminance the target has been subjected to, in time and/or in space, wherein the control of luminance is based on the estimate of the trajectory of the target and the function rate related to the target eye adaptability to changes in luminance. As a result, the present invention mitigates problems related to an occurrence of a rapid change in luminance, such as e.g. discomfort and/or limited eyesight for a person subjected to such a change. In contrast, prior art systems of lighting adaptation with presence detection provide a slower luminance adaptation. Hence, prior art systems do not provide a suitable luminance adaptation for a moving target.

The present invention is even more advantageous if luminance in the space is provided by low-energy light sources such as e.g. fluorescent lights. As low-energy light sources are often slower in providing a luminance when they are turned on, compared to e.g. incandescent lights, the efficiency of the present invention is particularly advantageous. In other words, the benefit of an estimation of a trajectory of a target for controlling luminance in a space, as in the present invention, becomes even more enhanced, as the low-energy light sources for generating luminance in the space may be activated in advance such that a desired luminance (with respect to adaptability of the target eye to changes with luminance) is obtained at the right time at a particular position of the estimated trajectory. The control unit and the method may thereby further control luminance in a space based on illumination performance/properties of the light sources generating the luminance. In this way, the present invention provides an even further improved control of luminance in a space.

Another advantage of the present invention is that the control provided by the inventive control unit and/or the inventive method reduces the energy consumption as compared to other prior art systems. Based on the estimated trajectory of the target, luminance may be controlled to lower the energy consumption in the space. More specifically, luminance in a space (or subspace) which does not contribute to luminance in the space (or subspace) where the target is estimated to be present, may be controlled to be reduced or to be zero. For example, the control unit may increase luminance in the estimated trajectory of the target, e.g. by increasing luminance in the space along (or in the vicinity of) the estimated trajectory of the target and decreasing luminance in the space further away from the estimated trajectory of the target. As compared to prior art systems, the present invention is advantageous in that luminance may be more dynamically controlled as it is based on the estimated trajectory of the target, i.e. on locations of the target estimated in advance.

The control unit for controlling luminance in a space is configured to estimate a trajectory of a target relative to a space. It will be appreciated that the term "space" may be construed as a position/an area (indoor or outdoor) or a room wherein a target is estimated to be temporarily present, or to be present in a future time. The space may be a partially closed space, such as a room, in which the target may move. The space may also be another room, corridor, or the like, towards which the target is estimated to move. Moreover, the space may be an outdoor space, e.g. a space outside the door/entrance to a house, garage, or the like. Analogously, the terms "lighting in a space" may relate to indoor lighting, i.e. lighting in an indoor space, as well as outdoor lighting, i.e. lighting in an outdoor space.

By the terms "estimate a trajectory", it is meant that the control unit may in advance anticipate/predict a location, movement and/or a path of a target, or at least an approximate location, movement and/or a path of a target. In other words, the control unit may estimate/detect a direction of movement and/or estimate/detect a velocity of (movement of) the target. For example, the control unit may estimate the trajectory of a target, estimated to be located e.g. at coordinates $x_1$, $y_1$, $z_1$ at time $t_1$, to be located e.g. at coordinates $x_2$, $y_2$, $z_2$ at time $t_2$, wherein $t_2 > t_1$, and the axes x, y, and z are orthogonal Cartesian axes.

The control unit is configured to control luminance based on the estimated trajectory of the target relative to the space. In other words, luminance in the space is controlled based on the beforehand estimate/prediction of the target trajectory relative to the space. The present invention is advantageous in that the control of luminance in the space thereby becomes dynamically adaptable based on the estimated target trajectory, improving the luminance compared to the prior art.

Furthermore, the control unit is configured to control luminance based on a function rate corresponding to an adaptability of the target eye to changes in luminance. The function rate may here be construed as a mathematical function or operative matrix relating to an adaptability of the target eye to changes in luminance.

The function rate may for example be based on the ability of the pupil(s) of the target eye to adapt to luminance changes. As some targets (e.g. elderly) may be in need of higher luminous intensities than other targets (e.g. younger persons), for everyday occupations such as e.g. reading, playing games, sewing, etc., a change in luminance in such a space to a lower luminous intensity (or when moving to another space with a lower luminous intensity) may be significant. Moreover, the reflex that causes the pupil(s) to dilate at low luminance intensities, i.e. the adaptation of the eye to a darker environment, is a slower process and not as extensive for an older person compared to a younger person.

Furthermore, elderly people often experience a prolonged recovery time for a light reflex, e.g. a glary light source. This recovery time may in some cases be 30% longer for an old person compared to a young person.

Furthermore, it will be appreciated that the adaptability of the target eye to changes in luminance may be dependent on the absolute luminance level in the space (and therefore need not necessarily be a fixed parameter). The function rate, corresponding to an adaptability of the target eye to changes in luminance, may therefore further be based on this absolute luminance level.

The present invention is particularly advantageous in that it alleviates problems related to changes in luminous intensities by conveniently controlling the luminance in the space based on a function rate corresponding to an adaptability of the target eye to changes in luminance.

According to an embodiment of the present invention, the control unit may further comprise means for receiving information relevant to the space. The means may provide the control unit with information of the space in situ, e.g. information relating to the shape of the space and/or furniture arranged in the space. Alternatively, the means may receive information in advance relative to the space (e.g. drawings, designs and/or plans). The present embodiment is advantageous in that the control of luminance may be even more conveniently adapted to the space. A further advantage provided by the means for receiving information relevant to the space compared to any previously provided information of the space is that the means may register possible changes in the space (e.g. refurnishing). This is beneficial, as the control unit may control luminance based on information regarding the present structure/appearance of the space. Furthermore, the luminance may be controlled based on information on how the structure of the space and/or the furniture cast shadows in the space. For example, the control of the luminance to avoid shadow is advantageous, as some targets may be intimidated by darkness arising from shadows. Moreover, some targets may interpret shadows as persons, and be frightened by them.

The means for receiving information relative to the space may comprise means for transmitting and receiving signals, e.g. a sensor and a receiver. Alternatively, the means may be any picture recording system (e.g. a camera or film camera) for receiving information relevant to the space.

According to an embodiment of the present invention, the control unit may further be configured to control luminance based on the received information. An advantage with the present embodiment is that the control of luminance in the space may be even further improved based on the received information, which thereby further contributes to an improved luminance for the adaptability of the target eye to changes in luminance. It will be appreciated that the control of luminance in a space may be improved with respect to information relevant to the space, wherein the information may comprise properties such as the space itself (e.g. shape), the distribution of the space (e.g. room, room/corridor), reflections in the space (e.g. from walls/ceilings), and/or targets/objects provided in the space (e.g. persons, furniture).

Furthermore, the control unit may further be configured to control luminance based on the information of possible targets (persons) which are intended to be present (housed) in the space. For example, the information may indicate that the space may be an institution, a hospital, home for the aged, elderly home, or any other type of home/care institution, wherein targets may be in special need of adapted luminance. Hence, the control of luminance in the space may be ameliorated based on the information related to one or more of these aspects.

According to an embodiment of the present invention, the control unit may further be configured to determine the function rate based on the received information. An advantage with the present embodiment is that the function rate may benefit from information relevant to the space in the sense that the function rate may be more suitably adapted to the environment/properties of the space. It may for example be of interest if walls in the space are highly reflective such as mirrors, in order to control the luminance adequately. An improved function rate renders an even more suitable control of luminance in the space. By the term "based on", it may be construed that the function rate is a function of (or dependent on) the information, i.e. that properties of the function (e.g. thresholds, gradients, etc.) may change with the information.

The function rate may be based on information regarding any property of the space which may influence the rendering of luminance in the space, which in turn relates to the adaptability of the target eye to changes in luminance. For example, properties such as the structure of the space, reflective/light-absorbing surfaces, windows, and/or targets/objects provided in the space may influence the function rate. Hence, the function rate becomes even further improved taking information relative to the space into consideration, thereby improving the control of luminance in the space.

Furthermore, the information relevant to the space may further comprise information of any target (e.g. person) intended to be housed in the space, which is advantageous since the function rate may be adapted to these targets, thereby even further improving the control of luminance in the space. For example, if the received information indicates that the space is intended for elderly people, such as a home for the old/aged/retired, the function rate may be selected to correspond to a deteriorated/reduced adaptability of the target eye to changes in luminance. For this purpose, the control unit may comprise a memory with look-up tables on order to retrieve an adequate function rate corresponding to the received information. A specific function rate may e.g. correspond to a specific age of the persons intended to be housed in the space or to a specific type of environment (reflective surfaces, windows, etc.).

According to an embodiment of the present invention, the information may relate to a physical condition of the target intended to be housed in the space, the physical condition preferably being indicative of the adaptability of the target eye to changes in luminance and/or an age of the target.

An advantage with the present embodiment is that the control of luminance in the space takes into account information relating to the physical conditions/abilities of the targets, which is particularly advantageous when these conditions indicate a reduced or deteriorated adaptability to changes in luminance such as for elderly persons.

According to an embodiment of the present invention, the control unit may further be configured to estimate the trajectory based on the received information. An advantage with the present embodiment is that the estimate of the trajectory may be even further improved based on the received information, thereby improving the control of luminance in the space. It will be appreciated that information relevant to properties of the space such as shape of the space (e.g. rectangular, quadratic, round), distribution of the space (e.g. room, room/corridor) and/or targets/objects provided in the space (e.g. persons, furniture) provides an ameliorated estimate of the trajectory. As a result, this information, on which the estimation of the trajectory may be based, further improves the control of luminance in the space, as the control unit may, from the information, estimate feasible/probable trajectories relative to the space (e.g. corridors, paths between furniture) and/or more unfeasible/improbable trajectories (e.g. due to obstructive elements such as furniture).

According to an embodiment of the present invention, the control unit may further be configured to synchronize luminance with respect to the trajectory. An advantage with the present embodiment is that the control of luminance in the space is adapted to the estimated positions of the target in the space. The luminance may be adapted to positions where the target was estimated to be present at a previous time, is estimated to be present at a current time point, and/or is estimated to be present at a future time point. In other words, luminance in a position (or in a vicinity of the position) wherein the target is estimated to be located in the space at a present time and/or any estimated future location of the target in a future time (or even previous location in a past time) may be controlled based on one or more of these locations as a function of time and the function rate corresponding to the adaptability of the target eye to changes in luminance. It will be appreciated that a time-dependent and trajectory dependent control of luminance in a space may even further contribute to an ameliorated luminance for the target in the space regarding the adaptability of the target eye to changes in luminance. Hence, the present embodiment efficiently controls luminance in a space by synchronizing luminance with the target movement.

Furthermore, the present embodiment is advantageous regarding energy consumption, as luminance in a space (or subspace) wherein the target is not estimated to be present (at present time and/or at a future time) may be reduced or set to zero.

According to an embodiment of the present invention, the control unit may further be configured to estimate the trajectory as a function of time for determining the function rate. The present embodiment is advantageous in that the control unit may itself determine the function rate in that the adaptability of the target eye to changes in luminance may be related to the properties of the trajectory as a function of time of the target. The relationship between the estimated trajectory and the function rate may depend on properties related to the target (e.g. age) and/or the space (structure, furniture, etc.). For example, a slow trajectory as a function of time, i.e. a slow movement of the target, may indicate that the target is of old age and/or has a limited visibility. In turn, the control unit may determine the function rate based on these observations/estimations. The present embodiment is advantageous in that the control unit may itself determine the function rate. Further, together with the received information, the present embodiment is advantageous in that the control unit makes an even more accurate determination of the adequate function rate, thereby improving the luminance control. Furthermore, properties related to the relationship between trajectory and space, e.g. an estimated trajectory close to e.g. a window and/or a reflective wall, may further contribute to the determination of the function rate.

According to an embodiment of the present invention, the control unit may further be configured to control luminance based on a previously estimated trajectory. An advantage with the present embodiment is that the previously estimated trajectory (or trajectories) in time may provide the control unit with additional information such that the control of luminance may be even further improved. Previous trajectories of a target in a space may indicate a pattern for the present trajectory of a target, thereby increasing the probability of the location of the target according to the estimated trajectory, which in turn leads to an improved control of luminance. For example, previous trajectories may indicate that the target moves along similar paths in the space. Furthermore, previous trajectories may indicate that the target movement in the space is dependent on time (i.e. morning, noon and/or evening). Hence, the control of the luminance is improved based on previously estimated trajectory information in space and/or time. For this purpose, the control unit may comprise a memory for recording such previously estimated trajectories. Further, a processing unit may be provided to compute such previously estimated trajectories and thereby derive any trend. A clock or timing system may also be provided in order to determine any dependence of the estimated trajectories on time.

According to an embodiment of the present invention, the control unit may further be configured to control luminance based on a spatial arrangement of a light source adapted to illuminate the space. In other words, the control of luminance may be based on the position(s) of the light source(s) relative to the target, the space itself and/or objects within the space. The present embodiment is advantageous in that the luminance from light sources may be controlled based on properties such as the distance between light source and target, distribution of light from the light source based on the space (e.g. corners) and/or shadows behind objects/targets in the space. Hence, based on the spatial arrangement of the light source(s), a distribution of luminance may be estimated in the space, and the control of luminance may hereby be even further improved.

According to an embodiment of the present invention, the control unit may further be configured to control luminance based on an estimated orientation of the target relative to the spatial arrangement of the light source. By the term "orientation" it is here meant the corporal direction of the target, i.e. the direction towards which the target is turned.

It will be appreciated that the orientation of the target may be estimated based on the estimated trajectory of the target. For example, it may be estimated that the direction of sight of the target may approximately be in the direction of the trajectory, i.e. that a target looks in the direction of the target's direction of movement (i.e. a target usually looks in a forward direction).

An advantage with the present embodiment is that the control unit may even further improve the control of luminance in the space, as the control unit may prevent that a target becomes dazzled by a light source, the light of which is emitted in the direction of sight of the target. Hence, the control unit may dim or turn off a light source based on an estimated orientation at the present time (or in a future time) of the target, thereby improving the luminance control. Analogously, a light source which light is estimated to be emitted towards the back and/or side of a target, may be turned on or increased by the control unit (e.g. for compensation of a dimmed/turned off light source), if it is estimated that the light does not dazzle the target.

Hence, the luminance may be controlled dynamically by the control unit, based on the orientation of the target, which in turn provides an improved luminance control in the space. This embodiment is particularly advantageous in spaces intended for elderly people, as people of old age often experience a prolonged recovery time after being dazzled, e.g. by a glary light source.

According to an embodiment of the present invention, the control unit may further be configured to individually control the luminous intensities of a plurality of light sources arranged along and/or in a vicinity of the trajectory. An advantage with the present embodiment is that the control unit may dynamically control the luminance relative to the estimated trajectory of the target, thereby improving the luminance in the space. The luminous intensities of the plurality of light sources may further be controlled based on the (internal) distance between adjacent light sources, even further improving the luminance.

A plurality of light sources may be arranged along an estimated trajectory of a target, e.g. in a corridor. The control unit may e.g. increase or decrease the luminous intensities of the plurality of light sources along the estimated trajectory of the target, thereby adapting the luminance gradually in the space with respect to the adaptability of the target eye to changes in luminance. For example, a luminous intensity may be gradually decreased for each light source along the estimated trajectory, such that the target experiences a decrease (e.g. linear with time) in luminance, until a preferred luminance has been reached in the space. This control of luminance provides a convenient luminance for a target with respect to the adaptability to changes in luminance.

According to an embodiment of the present invention, the control unit may further be configured to provide a control signal to each one of a plurality of light sources arranged along and/or in a vicinity of the trajectory or a single control signal to at least one of a plurality of light sources arranged along and/or in a vicinity of the trajectory, the single control signal instructing the at least one of the plurality of light sources to retransmit the single control signal to at least another light source such that, eventually, all light sources are reached by the single control signal.

An advantage with the present embodiment is that the control unit may generate and communicate either a plurality of control signals or a single control signal such that the light sources obtain information with respect to luminance. Such control signal may comprise information related to a position of a light source, luminance, and time. For example, the control unit may be configured to communicate a control signal indicating a luminous intensity to a light source, either by wire or by wireless communication. Furthermore, the control unit may request/inform/instruct a light source to, in turn, communicate information to yet another light source, which possibly, is not in communication with the control unit. Hence, even in the case the control unit may not establish direct communication with all light sources (e.g. due to distances and/or corners which may reduce a signal strength by wireless communication), the control unit may generate a control signal such that a communication is established between the light sources themselves, thereby even further improving the luminance in the space.

According to an embodiment of the present invention, there is provided a lighting control system for controlling a lighting function of a light source. The lighting control system comprises a transmitter for transmitting a probing signal within a transmitting range. Furthermore, the lighting control system comprises a plurality of receivers for receiving a return signal being a part of the probing signal that is reflected against a target present within the transmitting range. Moreover, the lighting control system comprises a control unit as defined in any one of the preceding embodiments, the control unit being in communication with the plurality of receivers to estimate the trajectory.

It will be appreciated that the specific embodiments and any additional features described above with reference to the control unit are likewise applicable and combinable with the method according to the second aspect of the present invention.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION

In the following description, the present invention is described with reference to a control unit for controlling luminance in a space and a lighting control system for controlling a lighting function of a light source.

Figure 1:
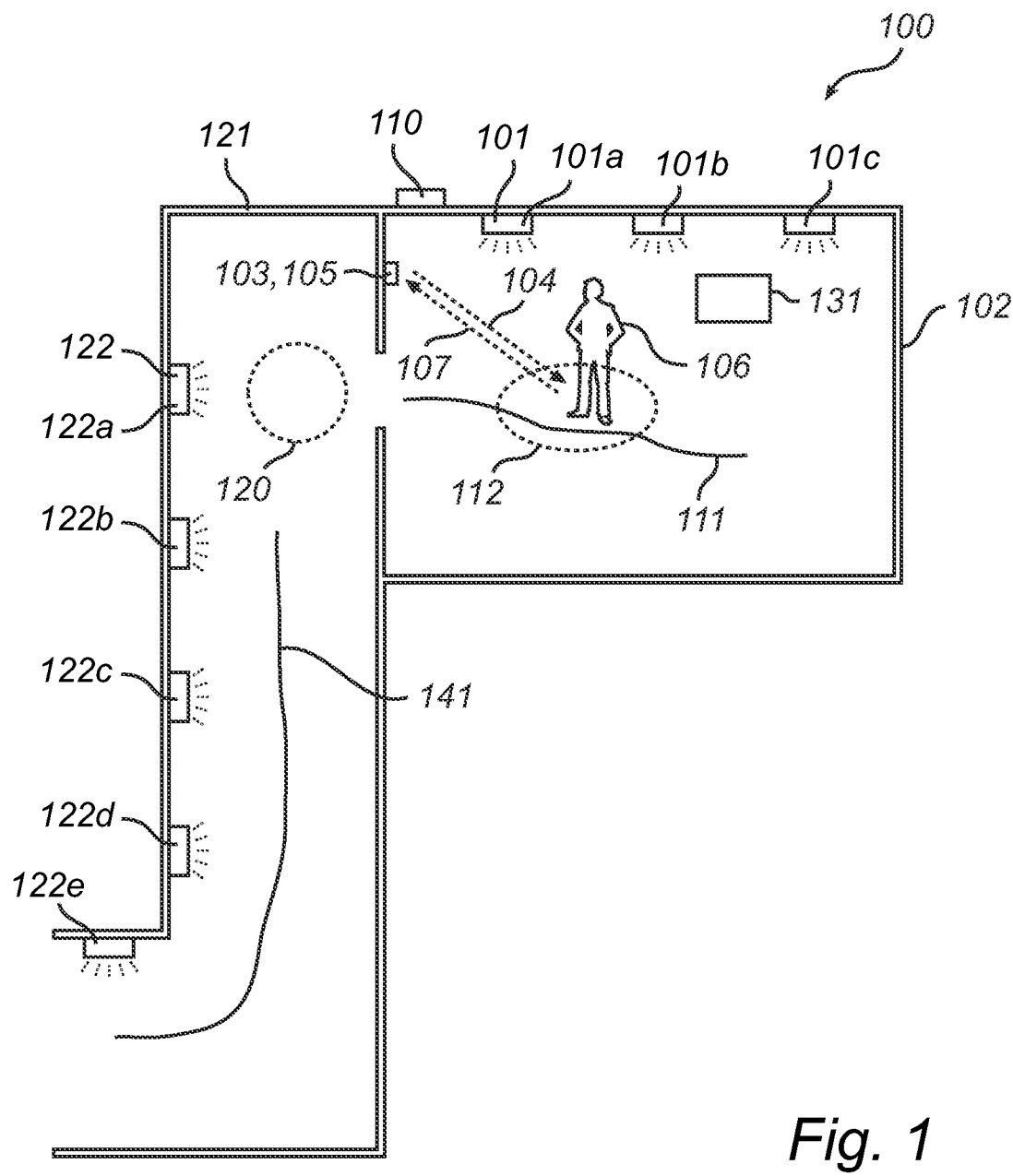
FIG. 1 is a schematic illustration of a lighting control system for controlling a lighting function.

FIG. 1 is a schematic illustration of a lighting control system 100 for controlling luminance in a space, wherein the luminance is generated by a light source arrangement 101. The light source arrangement 101 is realized as three light sources 101a, 101b and 101c which are arranged in a room 102 on a wall thereof. On a wall of the room 102 is positioned a transmitter 103 for transmitting a probing signal 104 within a transmitting range. Close to the transmitter 103 on the wall of the room 102 is positioned a plurality of receivers 105. The transmitter 103 and the plurality of receivers 105 may be separated. Alternatively, the transmitter 103 and the plurality of receivers 105 may be integrated in one single transmitter/receiver (transceiver) arrangement.

The probing signal 104 from the transmitter 103 may be reflected against a target 106 present within a transmitting range of the transmitter 103, thereby resulting in a return signal 107. Here, the probing signal 104 is reflected on a target 106, schematically depicted as a person, who is momentarily present approximately in the middle of the room 102.

A control unit 110 is in communication with the plurality of receivers 105 and is further connected to the light source arrangement 101, wherein the communication/connection may be provided either by wire or by a wireless technique. The control unit 110 is configured to estimate a trajectory 111 of the target 106 relative to a space 112 by means of the transmitter 103 and the plurality of receivers 105. The estimate of the trajectory 111 of the target 106 may be performed based on techniques/algorithms known in the prior art. For example, the control unit 110 may measure a location of the target 106 e.g. at coordinates $x_1$, $y_1$, $z_1$ at time $t_1$, at coordinates $x_2$, $y_2$, $z_2$ at time $t_2$, and at coordinates $x_3$, $y_3$, $z_3$ at time $t_3$ wherein $t_3 > t_2 > t_1$, and the axes x, y, and z are orthogonal, Cartesian axes. Then, the velocity and/or acceleration of the target 106 may be measured/estimated at coordinates $x_3$, $y_3$, $z_3$ at time $t_3$ for an estimate of the trajectory 111 of the target 106. For example, based on the information of the measured/estimated position, velocity and/or acceleration of the target 106 at the time instant $t_3$, the control unit 110 may estimate the trajectory 111 of the target 106 such that the target 106 is estimated to be present at coordinates $x_4$, $y_4$, $z_4$ at a coming time $t_4$.

The space 112 may be any location/position/area wherein the target 106 is estimated to be present at a present time, or any location/position/area towards which the target 106 is estimated to move, i.e. a forthcoming, expected position of the target 106. It will be appreciated that the space 112 may be construed as a two-dimensional area or as a three-dimensional space. The space 112 in FIG. 1 is shown approximately in the middle of the room 102 in a vicinity of the target 106, but may alternatively be provided anywhere in the room 102 (or outside the room 102 in the vicinity of the target 106). Alternatively, the space 112 may be the room 102 itself. The luminance in the space 112 is provided by the light source arrangement 101 in the room 102 and/or any other contribution of light, e.g. daylight which enters into the room 102.

The control unit 110 is configured to control the luminance in the space 112 based on the estimated trajectory 111. The control unit 110 may e.g. control the light sources 101a, 101b and/or 101c with respect to the estimated trajectory 111 of the target 106 such that the luminance in the space 112 is controlled. The control unit 110 may control the luminance in the space 112 e.g. based on the position of the light sources 101a, 101b and/or 101c relative to the target 106. For example, the control unit 110 may control the luminance in the space 112 based on the distance between the light sources 101a, 101b and/or 101c and the target 106.

The control unit 110 is configured to control the luminance in the space 112 based on a function rate corresponding to an adaptability of the target eye (eye(s) of the target(s)) to changes in luminance. The function rate may for example be based on the ability of the pupil(s) of the target eye to adapt to luminance changes. For example, if the luminance in the room 102 is to be changed, e.g. from a low luminous intensity to a high luminous intensity, or vice versa, the control unit 110 may gradually control the luminance in the space 112 based on the function rate. For example, if the luminance in the room 102 is low (e.g. at night), and the target 106 starts to move within the room 102 (e.g. for moving from a bed to a toilet), the control unit 110 is configured to control the luminance based on the trajectory of the target 106 and the function rate. For example, if the control unit 110 estimates that the target 106 moves from the right hand side of the room 102 towards the left hand side of the room 102, the control unit 110 may increase the luminous intensity from the light source arrangement 101. This may be realized as the light from light source 101c being relatively low, the light from light source 101b being at a medium level, and the light from light source 101a being at a relatively high level, such that the luminance along the estimated trajectory 111 of the target 106 is gradually increased. Analogously, the control unit 110 may decrease the light from the light source arrangement 101 along the estimated trajectory 111 of the target 106 within the room 102. In either case, the control unit 110 may control the luminance in the space 112 such that the target 106 may conveniently adapt to changes in luminance.

A corridor 121 is provided adjacent the room 102, wherein the target 106 may pass between the room 102 and the corridor 121, e.g. through a door. Alternatively, the corridor 121 may be any kind of space such as a room, wardrobe, garage, an outdoor space, or the like. In the corridor 121, a light source arrangement 122 is realized as five light sources 122a-e, which are arranged on a wall of the corridor 121.

From the estimated trajectory 111, it may be estimated that the target 106 is about to leave the room 102 (e.g. the space 112) and enter into a space 120 in the corridor 121. If the control unit 110 estimates the entrance of the target 106 from space 112 into space 120, the control unit 110 may control the luminance in the space 120 based on a function rate corresponding to an adaptability of the target eye to changes in luminance. For example, if the space 112, wherein the target 106 is momentarily present, is bright (i.e. that there is a high luminous intensity in the space 112), and the control unit 110 estimates that the target 106 will move to a space 120 which is dark (i.e. that there is a low luminous intensity in the space 120), the control unit 110 may control the luminance in the space 120 to increase the luminous intensity in the space 120 based on the function rate corresponding to an adaptability of the target eye to changes in luminance. The control unit 110 may control the light source arrangement 122 such that the target 106 becomes gradually accustomed to the luminance in space 120. For example, the control unit 110 may control the light source arrangement 122 such that the luminance is gradually decreased from a high luminous intensity in the room 102 to a lower luminous intensity in the corridor 121. As exemplified in FIG. 1, the light source 122a, close to the space 120 wherein the target is estimated to be present, may be controlled by the control unit 110 to provide a convenient luminance in the space 120 wherein the target 106 is estimated to be present. The control unit may therefore control the luminous intensity of the first light source 122a arranged in the corridor to be substantially identical to the luminous intensity provided by the light source arrangement 101 in the room 102 and the other light sources may have a decreasing luminous intensity from the end of the corridor close to the room 102 to the opposite end such that a lower, but still convenient (e.g. with respect to the walls of the corridor) luminance is provided in the corridor.

The control of luminance in the space 112 may be even further improved by means for receiving information relevant to the space 112, wherein these means e.g. may comprise a transmitter 103 and a plurality of receivers 105. For example, the means may further detect any object (e.g. furniture) present in the room which may obstruct the light from the light source arrangement 101 towards the space 112. In FIG. 1, a cupboard 131 is provided between the light source 101c and the space 112 such that the light from the light source 101c may, at least partially, be obstructed by the cupboard 131. The control unit 110, being configured to control the luminance in the space 112 based on the trajectory 111 of the target 106, may thereby dim/switch off light source 101c and/or increase the light from light sources 101a and 101b such that a preferred luminance is provided in space 112. Analogously, the control unit 110 may control the luminance in space 112 based on the properties of the room itself (e.g. corners, reflective walls/ceilings), to provide a preferred luminance in the space 112. Furthermore, the function rate may be based on information regarding the mentioned (or other) properties of the space 112 which may influence the rendering of luminance in the space, which in turn relates to the adaptability of the target eye to changes in luminance. Moreover, the information relevant to the space 112 may further comprise information about the target 106 intended to be housed in the space 112. For example, the control unit 110 may be configured to determine the function rate based on the information that the space 112 is intended for elderly people, such as a home for the old/aged/retired. For example, the function rate may be provided to correspond to a deteriorated/reduced adaptability of the eyes of the target 106 to changes in luminance.

Information about e.g. the target to be housed in the space may be entered by any entering means associated with the control unit. The control unit 110 may be configured to estimate the trajectory 111 based on the information relevant to the space 112. For example, the trajectory 111 is unlikely to pass an area where a piece of furniture is arranged, e.g. an area comprising the cupboard 131 in FIG. 1. The information may on the other hand comprise estimated trajectories 111 which are more likely for a target 106, such as e.g. "paths" between pieces of furniture, through doors, etc. The control unit may be configured to compute/determine such possible trajectories based on the received information.

The control unit 110 may be configured to synchronize the luminance with respect to the trajectory 111. For example, if it is estimated from the trajectory 111 that the target 106 will move from the space 112 in the room 102 to the space 120 in the corridor 121, the luminance in the space 120 may be synchronized with the trajectory 111 such that the luminance in the space 120 is adapted to the target eye at the time, or even before the target 106 enters into the space 120. Furthermore, at this time, one or more of the light sources 101a, 101b and 101c may be dimmed/turned off if the contribution of luminance from the light source 101 in the space 120 is estimated to be small or negligible (zero).

The control unit 110 may be configured to estimate the trajectory 111 as a function of time (i.e. the speed of the target 111), and thereby determine the function rate. For example, a slow trajectory 111 may indicate that the target 106 is old and/or has a limited visibility. Moreover, the luminance in the space 112 and/or 120 may be controlled by the control unit 110 based on previous trajectories. In other words, the control unit 110 may control the luminance based on previous trajectories e.g. within the room 102, from the room 102 into the corridor 121, and/or through the corridor 121, such that a trajectory 111 is estimated based on this information. The control unit 110 may hereby estimate a statistically more probable trajectory 111, thereby improving the luminance in the space(s) 112/120.

The control unit 110 may be configured to control the luminance based on a spatial arrangement of the light source arrangement(s) 101/122 arranged for illuminating the space (s) 112/120. For example, the spatial arrangement of the light sources 101a-c may influence the luminance in space 112 e.g. based on several factors, such as e.g. the distance and/or the arrangement of furniture between the target 106 and the light sources 101a-c.

The control unit 110 may be configured to control the luminance based on an estimated orientation of the target 106 relative to the spatial arrangement of the light source. For example, if the target 106 leaves the room 102 and moves into the space 120 in the corridor 121, the orientation of the target 106, i.e. the direction of sight of the target 106, may be towards the light source 122a. To avoid that the target 106 becomes dazzled by the light from the light source 122a, the control unit 110 may decrease the luminous intensity of the light source 122a and/or any other light source which may cause unwanted dazzling light towards the eyes of the target 106.

The control unit 110 may be configured to individually control the luminous intensities of a plurality of light sources arranged along and/or in a vicinity of the trajectory 111. For example, if the target 106 is estimated to move in the corridor 121, e.g. from a position close to the door of the room 102 and down the corridor 121 along a trajectory 141, the control unit 110 may control the light sources 122a-e accordingly. If the target 106 leaves the room 102 and into the space 120 in the corridor 121, the luminance in the space 120 may predominantly be provided by the light from the light source 122a. If the target 106 at a previous time instant was subjected to e.g. a high luminous intensity in the room 102 and the intended luminance in corridor 121 is a low luminous intensity, the luminance in space 120 may be controlled by the control unit 110 to be found at an intensity between the high and the low luminous intensity based on the function rate corresponding to the adaptability of the target eye to changes in luminous intensity. If the target 106 moves down the corridor 121, the luminance from lights 122b-e may be sequentially decreased based on the estimated trajectory 141 of the target 106 and the function rate, thereby conveniently adapting the luminance for the target 106. The decrease of the luminous intensity may for example be linear in time and/or space based on the trajectory 141 of the target 106. For example, if the luminous intensity in the room 102 is 1000 lx, the luminous intensity in the corridor 121 may be 800 lx from the light source 122a, 600 lx from the light source 122*b*, 400 lx from the light source 122*c*, etc. If the intended luminous intensity in the corridor 121 is e.g. 300 lx, this luminous intensity may be provided e.g. for light sources 122*d-e*. This will be appreciated, as at the time the target 106 moves further down the corridor 121 and is in the vicinity of light sources 122*d-e*, the eyes of the target 106 may have time to adapt to the reduced luminous intensity. In combination, or as an alternative to the spatial arrangement of the light sources 122*a-e*, the control unit 110 may control the luminous intensity as a function of time. For example, the control unit 110 may provide a linear change of luminous intensity, preferably in the range of 80-120 lx/min.

Alternatively, the inverse situation of the above example may occur, i.e. that the target 106 moves from a relatively dark room 102 towards a corridor 121 which is intended to be relatively bright. For example, if the target 106 at a previous time instant was subjected to e.g. a low luminous intensity in the room 102 and the intended luminance in corridor 121 is a high luminous intensity, the luminous intensity from the lights 122*a-e* may instead be sequentially increased.

The control unit 110 may be configured to provide a control signal to each light source 110*a-c*/122*a-e*, for controlling the luminance. Alternatively, the control unit 110 may provide a single control signal to one of the light sources 110*a-c*/122*a-e* which iteratively passes on the single control signal to at least one of the light sources 110*a-c*/122*a-e*. For example, the control unit 110 may provide a control signal to light source 122*a* in the corridor 121, which in turn passes on the single control signal to light source 122*b*, etc, until the last light source 122*e* has been reached by the control signal. In this way, the light sources 122*a-e* may provide a preferred luminance for the target 106 even in the case the control unit 110 itself is unable to communicate with each of the light sources 122*a-e* (this may be the case if the control unit 110 operates by wireless communication, and the light source 122*e*, mounted around the corner in the corridor 121, is out of reach from a wireless signal from the control unit 110).

Figure 2:
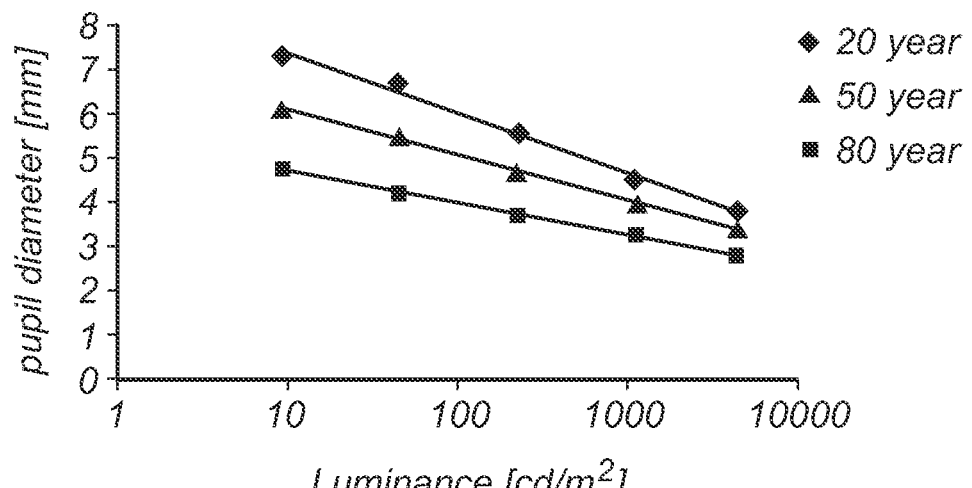
FIG. 2 is a diagram of the pupil diameter as a function of luminance for persons of different ages.

FIG. 2 shows the pupil diameter as a function of luminance for persons of 20, 50 and 80 years of age. At a relatively high luminous intensity, the pupil diameter may be approximately 4 mm for a young person, and approximately 3 mm for an elderly person. At a relatively low luminous intensity, the pupil diameter may be approximately 8 mm for a young person and approximately 5 mm for an old person, which results in a reduction of the pupil size area of approximately 60%. The function rate of the present invention may be based on this difference in target eye adaptation such that an improved luminance control for the target 106 may be provided.

Figure 3:
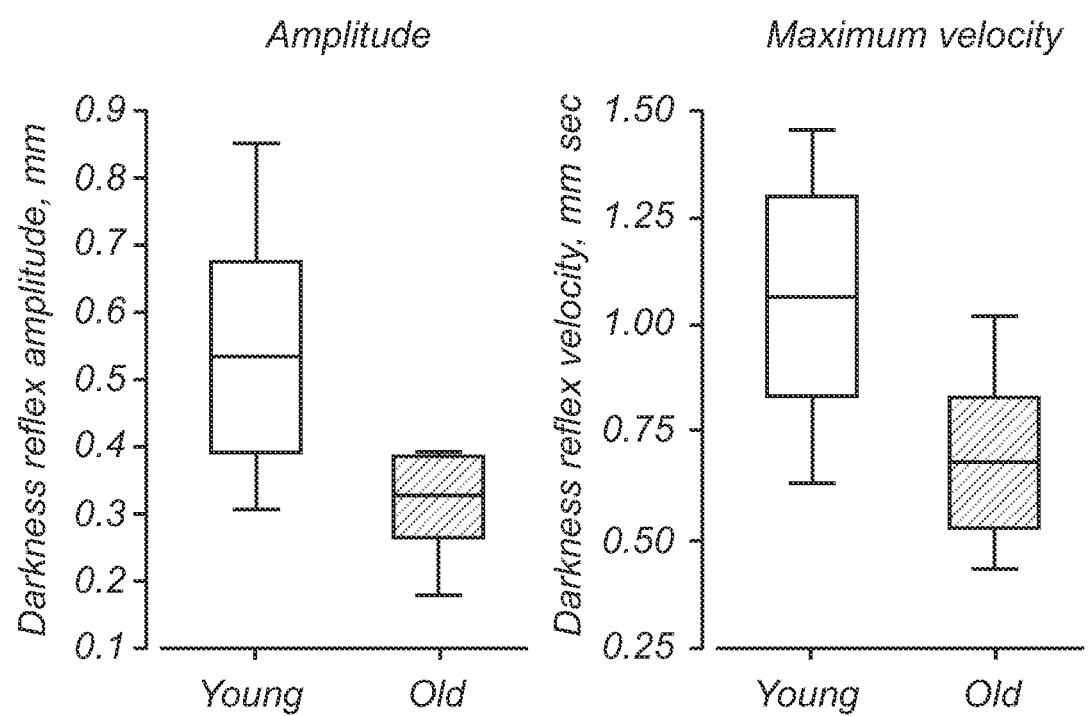
FIG. 3 is a diagram of a comparison of the amplitude and maximum velocity of the darkness reflex between persons of different ages.

FIG. 3 shows a comparison of the amplitude and maximum velocity of the darkness reflex between young and old persons. The darkness reflex that causes the pupil(s) to dilate at low luminance intensities, i.e. the adaptation of the eyes of a person to a darker environment, is a slower process and not as extensive for an older person compared to a younger person. Furthermore, elderly people often experience a prolonged recovery time for a light reflex, e.g. a glary light source. The function rate of the present invention may for example be based on the ability of the pupil(s) of the target eye to adapt to luminance changes, and the control unit 110 may thereby provide an improved luminance control for the target 106.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

For example, the size and/or shape of the room 102 and/or the corridor 121 may be different from that shown in FIG. 1. Furthermore, the positioning and/or number of the light source arrangements 101 and 122 may be different from that shown in FIG. 1. Moreover, the trajectories 111/141 of the target 106 are shown as examples, and any other trajectories within the room 102 and/or corridor 121 may be feasible. The control unit 110 may virtually be provided anywhere inside or outside the room 102 or corridor 121. Moreover, the control unit 110 may be incorporated in the plurality of receivers 105. The spaces 112/120 may be outdoor spaces and the light source arrangements 101 and 122 may be outdoor light fixtures, e.g. garden or street lights, networked and/or controlled by a control unit 110 for controlling the luminance in the outdoor space based on an estimated trajectory of a target in that outdoor space and on a function rate corresponding to an adaptability of the target eye to changes in luminance.

The invention claimed is:

1. A control unit for controlling luminance in a space, said control unit being configured to:
   estimate a trajectory of a target relative to said space, wherein said estimated trajectory runs from a first location with a first luminance level to a second location with a second luminance level, and wherein said estimated trajectory comprises at least one intermediate location, with at least one intermediate luminance level, disposed between said first location and said second location; and
   control said luminance in said space based on the estimated trajectory, on said first luminance level and said second luminance level, and on a function rate corresponding to an adaptability of an eye of the target to changes in luminance such that, at a given instant, said luminance in said space is at said first luminance level at said first location, at said at least one intermediate luminance level at said at least one intermediate location, and at said second luminance level at said second location along said trajectory, wherein said at least one intermediate luminance level is between said first luminance level and said second luminance level and wherein said control unit is configured to set said at least one intermediate luminance level and said second luminance level based on said function rate.

2. A control unit as claimed in claim 1, further comprising means for receiving information relevant to at least one physical condition of said target intended to be housed in said space, said physical condition being indicative of the adaptability of the target of said target to changes in luminance and/or an age of said target, and wherein said control unit is further configured to control said luminance in said space based on said information or to determine said function rate based on said information.

3. A control unit as claimed in claim 1, further comprising means for receiving information relevant to said space, wherein said controller is further configured to estimate said trajectory based on said information.

4. A control unit as claimed in claim 3, further being configured to synchronize said luminance in said space with respect to said trajectory.

5. A control unit as claimed in claim 4, further being configured to estimate said trajectory as a function of time for determining said function rate.

6. A control unit as claimed in claim 4, further being configured to control said luminance in said space based on at least one previously estimated trajectory.

7. A control unit as claimed in claim 6, further being configured to control said luminance in said space based on a spatial arrangement of at least one light source adapted to illuminate said space.

8. A control unit as claimed in claim 7, further being configured to control said luminance in said space based on an estimated orientation of said target relative to said spatial arrangement of said at least one light source.

9. A control unit as claimed in claim 8, further being configured to individually control the luminous intensities of a plurality of light sources arranged along and/or in a vicinity of said trajectory.

10. A control unit as claimed in claim 9, further being configured to provide a control signal to each one of a plurality of light sources arranged along and/or in a vicinity of said trajectory or a single control signal to at least one of a plurality of light sources arranged along and/or in a vicinity of said trajectory, said single control signal instructing said at least one of the plurality of light sources to retransmit said single control signal to at least another light source such that, eventually, all light sources are reached by said single control signal.

11. A lighting control system for controlling a lighting function of at least one light source, comprising:
   at least one transmitter for transmitting at least one probing signal within a transmitting range,
   a plurality of receivers for receiving at least one return signal, said at least one return signal being a part of said at least one probing signal that is reflected against a target present within said transmitting range, and
   a control unit as claimed in claim 1, said control unit being in communication with said plurality of receivers to estimate said trajectory.

12. A method for controlling luminance in a space, comprising the steps of:
   estimating a trajectory of a target relative to a space, wherein said estimated trajectory runs from a first location with a first luminance level to a second location with a second luminance level, and wherein said estimated trajectory comprises at least one intermediate location, with at least one intermediate luminance level, disposed between said first location and said second location; and
   controlling said luminance in said space based on the estimated trajectory, said first luminance level and said second luminance level, and on a function rate corresponding to an adaptability of an eye of the target to changes in luminance, such that, at a given instant, said luminance in said space is at said first luminance level at said first location, at said at least one intermediate luminance level at said at least one intermediate location, at said second luminance level at said second location along said trajectory, wherein said at least one intermediate luminance level is between said first luminance level and said second luminance level and wherein said at least one intermediate luminance level and said second luminance level are set based on said function rate.

13. A method as claimed in claim 12, wherein said first luminance level is higher than said second luminance level and wherein said function rate corresponds an adaptability of the eye of the target to a darker environment.

14. A method as claimed in claim 12, wherein said first luminance level is lower than said second luminance level and wherein said function rate corresponds an adaptability of the eye of the target to a light reflex.

15. A method as claimed in claim 12, wherein said function rate is based on an age of said target.

* * * * *